Sept. 23, 1958

A. A. BANEK 2,852,958

GRADER BLADE SUPPORT

Filed June 2, 1952

INVENTOR.
ALBERT A. BANEK
BY
ATTORNEY

Sept. 23, 1958　　　　　A. A. BANEK　　　　　2,852,958
GRADER BLADE SUPPORT

Filed June 2, 1952　　　　　　　　　　　　3 Sheets-Sheet 2

INVENTOR.
ALBERT A. BANEK
BY
ATTORNEY

Sept. 23, 1958     A. A. BANEK     2,852,958
GRADER BLADE SUPPORT
Filed June 2, 1952     3 Sheets-Sheet 3

INVENTOR.
ALBERT A. BANEK
BY
ATTORNEY

United States Patent Office 2,852,958
Patented Sept. 23, 1958

2,852,958

GRADER BLADE SUPPORT

Albert A. Banek, Greeley, Colo.

Application June 2, 1952, Serial No. 291,184

1 Claim. (Cl. 74—582)

This invention relates to powered earth-moving and highway equipment of grader, scraper, or maintainer type characterized by a blade susceptible of extensive angular and altitudinal adjustment, and more particularly to equipment of such type wherein an altitudinally and angularly adjustable blade mount is manipulatively suspended for operative disposition of the blade beneath the upward arch of a frame by means of links connecting between said mount and crank arms carried by the frame, and has as an object to provide a novel and improved link arrangement for so interconnecting the blade mount and crank arms.

A further object of the invention is to provide a novel and improved construction of link adapted to interconnect a conventional grader blade mount with the crank arms customarily provided for blade and mount adjustment and manipulation.

A further object of the invention is to provide a novel and improved link for manipulatively supporting a grader blade mount to accommodate obstruction-clearing altitudinal oscillation of the blade and its mount.

A further object of the invention is to provide a novel and improved link for manipulatively supporting a grader blade mount to provide either a resiliently length-adjustable or a rigid length-fixed coupling between said mount and a frame-carried element provided for mount manipulation.

A further object of the invention is to provide a novel and improved link for manipulatively supporting a grader blade mount which is adapted for use as a replacement or substitute for the conventional such links currently utilized.

With the foregoing and other objects in view, my invention consists in the construction, arrangement, and combination of elements as hereinafter set forth, pointed out in my claim, and illustrated by the accompanying drawings, in which—

Figure 1:
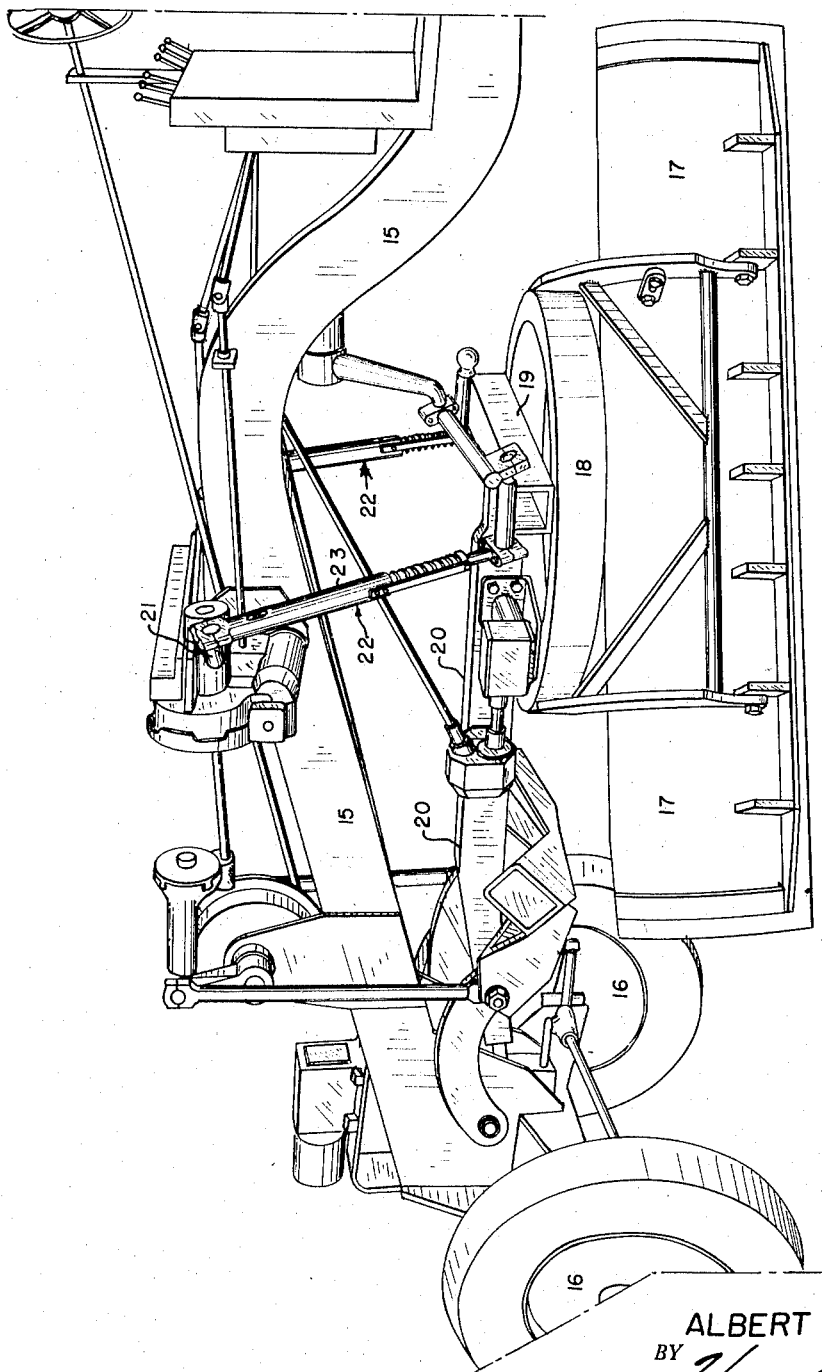
Figure 1 is a somewhat diagrammatic, perspective view of the blade and blade mount portion of a typical grader equipped with the improved links of the invention, ready for practical use, portions of the grader not essential to an understanding of the invention being broken away to conserve space.

As represented by Figure 1, powered grader and analogous equipment of a type extensively in use wherewith the improved link of the instant invention is adapted to function with advantage includes a rigid, upwardly-arched frame 15 supported by steerable wheels 16 at its forward end and by drive wheels (not shown) at its rearward end. A blade 17 is fixed beneath and substantially diametrically of a circle member 18 which is carried by and for rotation about a mount 19 secured to the rearward end of a drawbar 20 extending rearwardly and longitudinally beneath the arch of the frame 15 from a pivotal connection of its forward end with the forward end of said frame, thus to tractively relate the blade 17 with the frame 15 in an association accommodating altitudinal and extensive angular adjustment of the blade relative to the frame and to the plane and path of grader assembly travel. Independently and selectively operable to regulate and determine the altitudinal disposition of the mount 19 carrying the member 18 and blade 17 and also to regulate and determine the angular attitude of said mount transversely of the frame 15, crank arms 21 extending radially from shafts mounted for rotation on, at each side of, and parallel to the longitudinal axis of the frame 15 above said mount, are pivotally connected by means of links 22 with points of the mount 19 similarly spaced outwardly from opposite sides of the drawbar 20 on a line perpendicular to said drawbar and chordally of the circle member 18, so that independent, selective rotation of the shafts carrying the crank arms 21 may be applied in an obvious manner to elevate, to lower, and to transversely tilt the said mount 19 and the blade and circle member carried thereby.

The links 22 customarily utilized are length-rigid in a construction permitting of length adjustment and are hence effective to apply much of the grader assembly weight through the mount 19 to the blade 17 with the usual operative advantage, but such rigidity of the links precludes any altitudinal floating of the blade in reaction to stubborn obstructions, transmits directly to the frame all the impacts and altitudinal vibrations developed through blade action, and conduces to consequent blade damage. All of the foregoing is but representative of conventional grader construction and oganization herein illustrated and briefly described only to establish occasion for the instant invention and to evidence the mechancial environment wherein and wherewith the instant invention is serviceable.

A primary purpose of the invention being to condition the blade elements of conventional grader organizations for altitudinal play relative to the major grader assembly under certain operating conditions while preserving the manipulative and adjustable potential of the organization, inclusive of the capacity to weight-load the blade when operatively appropriate, it is practical and expedient to realize such purpose through the provision of novel and improved link 22 units employable in substitution for the conventional such links; various particular constructions of functionally-equivalent links suited to accomplish the primary purpose of the invention when installed as replacements for the conventional links 22 being illustrated and hereinafter described.

The pair of links 22 shown in Figure 1 as operatively installed in coupling relation between the separate crank arms 21 and points of the blade mount 19 are represented as substitutes or replacements for the conventional links constructed to give effect to the principles of the invention as detailed in Figures 2-6, inclusive. As shown in the views last noted, an elongated, rigid, tubular barrel 23 of appropriate size and suitable material telescopically receives and slidably accommodates a straight, rigid, cylindrical stem 24 in a coaxial association constituting a length-adjustable strut whereof the ends are constituted as cap bearings 25, preferably socketed for coaction with a ball, engageable with the pertinent crank arm 21 and blade mount 19 elements of the grader assembly designed to be intercoupled by the link 22; the said cap bearings 25 of the substitute or replacement link conveniently being the same as the corresponding elements of conventional links. Distinguishing from conventional link constructions, a collar 26 slidably embraces the stem 24 in a considerable spacing away from the adjacent end of the barrel 23 determined and maintained by means of rigid straps 27 fixed at their ends, as by means of studs or bolts 28, to diametrically-opposite points of the collar 26 periphery and to correspondingly-located points of the barrel 23 exterior surface adjacent the barrel open end, thus to align said straps 27 in spaced parallelism with and on opposite sides of the axis common to said stem and barrel. Slidably engaged with and on the stem 24 within the yoke of the straps 27 and between the collar 26 and adjacent end of the barrel 23, a stop ring 29 is arranged, as by means of a spaced series of holes 30 diametrically of the stem 24 selectively engageable by a bolt 31 diametrically of the ring 29, to be secured to said stem in any of several positions longitudinally of the stem and adjacent the barrel 23 end when the stem approaches the limit of its inward barrel penetration, and an expansive coil spring 32 loosely surrounds the stem 24 within the yoke in end-bearing engagement between the collar 26 and stop ring 29 to normally and yieldably urge said stem inwardly of the barrel. Near the end of the stem 24 within the barrel 23, a hole 33 diametrically of the stem is provided in end registration with slots 34 opening through and elongated longitudinally of the adjacent barrel 23 walls, and a bolt 35 engages through the so-registered hole and slots with a sliding fit relative to the barrel 23 elements thereby engaged to limit and determine reciprocatory travel of said stem relative to the barrel and to inhibit relative rotation therebetween. In a spacing from the hole 33 correlated with the length of the slots 34, a second hole 36 parallels said hole 33 through the stem 24 for end registrations with and exposure through the slot 34 ends more nearly adjacent the stop ring 29 when the bolt 35 is engaged against the opposite ends of said slots, so that, when desired, a bolt or pin 37 (Figure 6) may be entered through the so-registered hole 36 and slots 34 to lock the stem 24 to the barrel 23 for inhibition of all relative axial travel.

The stem 24 and barrel 23 lengths are so proportioned in correlation with the location of the slots 34, the position of the hole 33 and bolt 35, and the position of the stop ring 29 as determined by the holes 30, as to space the bearings 25 at the ends of the assembly apart a distance corresponding with the length of the conventional link 22 to be replaced when the stem is at the limit of its travel inwardly of the barrel under the influence of the spring 32, which limit of stem inward travel is attained when the bolt 35 engages the ends of the slots 34 remote from said spring. With a pair of the improved links represented by Figures 2-6 installed as replacements for conventional links in coupling relation between the blade mount 19 and crank arms 21 of the grader, as shown in Figure 1, engagement of the bolt or pin 37 through the slots 34 and hole 36 to lock the stem 24 to and at the limit of its inward travel axially of the barrel 23 conditions the link assembly to function as a length-fixed unit wherethrough angular and altitudinal adjustment of the blade mount may be had exactly as with the conventional link.

However, when the pins or bolts 37 are removed from an installation of the improved links the stem 24 is free to move outwardly of the barrel 23 against the pressure of the spring 32 and to reciprocate relative to said barrel within the range determined by the length of the slots 34, thus conditioning the blade 17 and its mount 19 for altitudinal oscillation within a limited range relative to the grader under certain conditions of crank arm 21 adjustment. As is manifest, the crank arms 21 may be manipulated to lift the link assemblies and through them to lift the blade 17 and its mount 19, such elevating action applied to the link assemblies first lifting the barrels 23 until the springs 32 balance the weight of the blade and its mount, or until the bolts 35 engage the lower ends of the slots 34, and the stem 24 is constrained to move with the associated barrel.

Similarly, the crank arms 21 may be manipulated to weight-load and hold the blade 17 against uprise from its working plane, since depression of the barrels 23 through the agency of the crank arms when the blade 17 is engaged with a surface to be worked operates to position the stems 24 at the limits of their travel inwardly of the associated barrels and engages the bolts 35 against the upper ends of the slots 34 in position to transmit downwardly-directed pressures through the link assemblies and to the blade. A third operating condition of the improved link assemblies associated with the grader as shown and described is attained through such manipulation of the crank arms 21 as acts to elevate the barrels 23 sufficiently to permit the weight of the blade 17 and its mount 19 acting through the stems 24 to moderately compress the springs 32 without lifting said blade away from engagement with the surface to be worked, in which relation of elements the stems 24 are moderately extended outwardly from their barrels 23, the stop rings 29 are retracted away from the adjacent barrel ends, and the bolts 35 are shifted to positions between and away from the ends of their slots 34 from which they may move in either direction longitudinally of the barrels 23 as the blade and its mount oscillate altitudinally in reaction to obstructions and irregularities characterizing the surface engaged by the blade; such third operation condition of the link assemblies thus accommodating a useful and advantageous floating action of the blade and its mount which permits altitudinal yielding of the blade without impairment of the blade angular and altitudinal adjustments, and the controls therefor, distinguishing the grader assembly.

Figure 7:
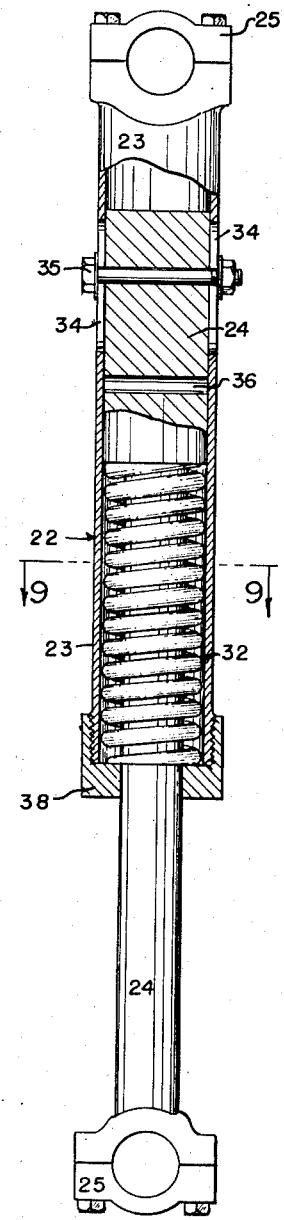
Figure 7 is an elevation, similar to Figure 2 and partly in section, of an alternative or modified link construction operatively exemplifying the principles of the invention.

The alternative or modified link assembly constructions shown in Figures 7-10 are structurally equivalent to and functionally identical with that shown in Figures 2-6 and hereinabove described, the differences evidenced by the alternative or modified constructions amounting to but variations of mechanical arrangement and detail. In the construction according to Figures 7 and 9, the barrel 23 of the first disclosure is replaced by a barrel 23' furnished with the cap bearing 25 at one end, of an interior diameter considerably exceeding the stem 24 diameter, and formed with the slots 34 intersecting its opposite walls in the arrangement heretofore set forth. The stem 24 carrying the cap bearing 25 at one end is formed with a radially-enlarged, cylindrical head 24' at its other end, said head being slidably receivable within said barrel 23', and the holes 33 and 36 diametrically traverse said head in the arrangement and for the purposes above specified. The head 24' is considerably shorter than the barrel 23' and the spring 32 loosely surrounds the stem 24 portion adjacent said head and is received within the open end portion of said barrel in end-bearing engagement between the shoulder at the junction of said head and stem and a cap 38 centrally apertured for the slidable accommodation of the stem 24 and removably and replaceably engaged with the otherwise open end of the barrel 23'. Obviously, the link assembly constituted as shown in Figure 7 is the full operative equivalent of the construction represented in Figures 2 and 3.

Figures 2, 3:
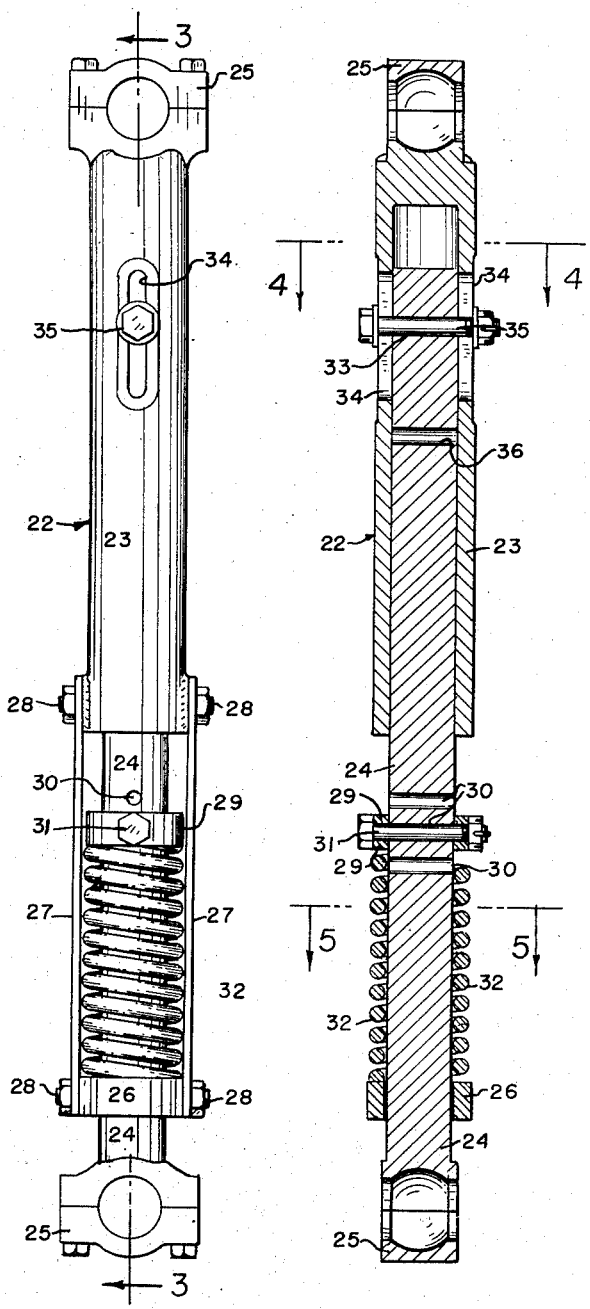
Figure 2 is a slide elevation, on a relatively enlarged scale, of the link represented in Figure 1 as removed from its association with elements of the grader.
Figure 3 is a section axially of the link shown in Figure 2 taken substantially on the indicated line 3—3 of said latter view.
Figure 4:
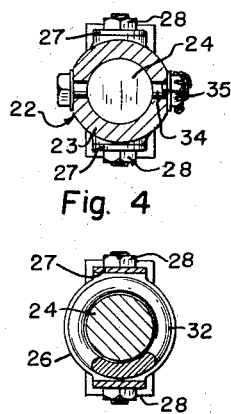
Figure 4 is a cross section taken substantially on the indicated line 4—4 of Figure 3.
Figure 5:
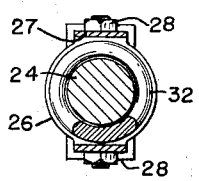
Figure 5 is a cross section taken substantially on the indicated line 5—5 of Figure 3.
Figure 6:
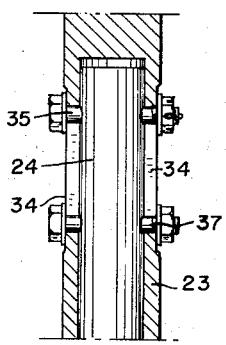
Figure 6 is a fragmentary, detail section corresponding to an upper portion of Figure 3 and illustrating an immobilized interassociation of elements alternative to the arrangement previously shown.
Figure 8:
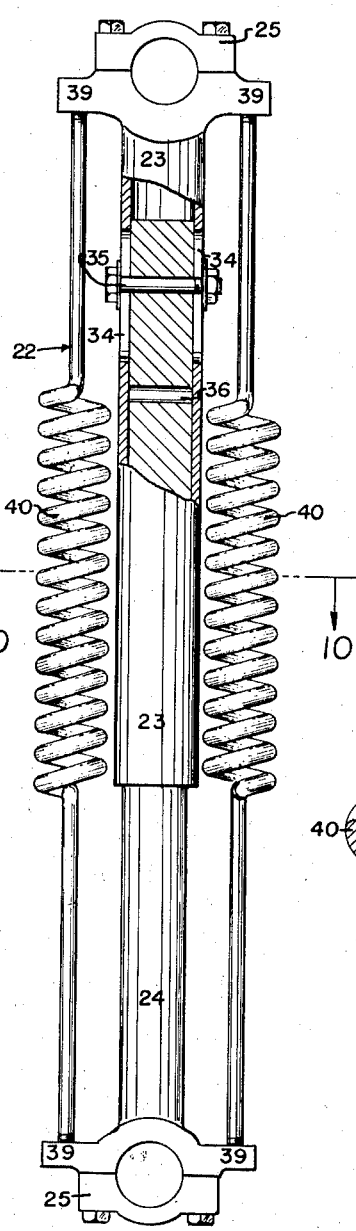
Figure 8 is an elevation partially in section and similar to Figure 7 illustrating yet another alternative or modified construction of the improved link.
Figure 9:
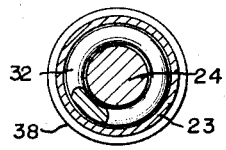
Figure 9 is a cross section taken substantially on the indicated line 9—9 of Figure 7.
Figure 10:
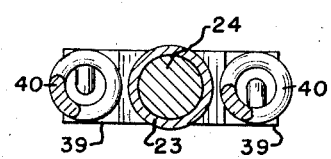
Figure 10 is a cross section taken substantially on the indicated line 10—10 of Figure 8.

In the link assembly organization according to Figures 8 and 10, the barrel 23 and stem 24 with their cap bearings 25 are slidably interrelated to dispose the slots 34, bolt 35, and holes 33 and 36 in the cooperative arrangement shown in Figures 2 and 3, the collar 26, straps 27, stop ring 29, and spring 32 being omitted. To resiliently couple the stem and barrel members of the Figure 8 showing, ears 39 are formed on and to project laterally at each side from the bearing 25 members fixedly-associated with the stem and barrel and a retractile coil spring 40 is fixed at its ends to and spans between the said ears 39 at the same side and on the opposite ends of the link assembly; two such springs 40 hence being utilized to spacedly and exteriorly parallel opposite sides of the barrel and stem assembly. Thus, in a reorganization of mechanical detail, the link assembly represented by Figure 8 is the full operative equivalent of, and may be interchanged with, the link assemblies of the preceding views and earlier descriptions.

Since changes, variations, and modifications in the form, construction, and arrangement of the elements shown and described may be had without departing from the spirit of my invention, I wish to be understood as being limited solely by the scope of the appended claim, rather than by any details of the illustrative showing and foregoing description.

I claim as my invention:

A grader blade support link comprising a tubular barrel having one closed and one open end formed with attaching means at its closed end, with screw threads exteriorly about its open end, and with registered slots longitudinally intersecting opposite sides of the barrel length portion adjacent said closed end, a centrally-apertured cap threadedly cooperating with and closing over the open end of the barrel, a cylindrical stem of less size than the barrel interior through and slidably coacting with said cap, a radially-enlarged, cylindrical head coaxially fixed to and in shouldered relation with said stem interiorly of the barrel for sliding coaction with the latter in a length adapted to span across and entirely close over said slots when at the limit of its travel inwardly of the barrel with the remote end of the stem exposed exteriorly of said cap, an expansive coil spring about said stem within the barrel in end-bearing engagement between said cap and the end of said head opposed thereto, whereby to yieldably urge said head and stem to the limit of their travel inwardly of the barrel, spaced, parallel holes diametrically through said head adapted to register with the opposite ends of said slots when the head is at the inner limit of its range of travel, bolts selectively engageable through said holes and the associated slot ends to limit and determine reciprocation of the head relative to the barrel and alternatively to immobilize the head relative to the barrel, and attaching means fixed to the exterior end of said stem.

References Cited in the file of this patent

UNITED STATES PATENTS

| | | |
|---|---|---|
| 226,534 | Moloney | Apr. 13, 1880 |
| 261,643 | Thomas | July 15, 1882 |
| 353,148 | Lehr | Nov. 23, 1886 |
| 537,346 | Maag | Apr. 9, 1895 |
| 643,240 | Shuart | Feb. 13, 1900 |
| 765,832 | Hamilton | July 26, 1904 |
| 812,666 | Miller | Feb. 13, 1906 |
| 957,315 | Duncanson | May 10, 1910 |
| 1,395,971 | Okell | Nov. 1, 1921 |
| 1,511,173 | McCarthy | Oct. 7, 1924 |
| 1,522,417 | Cock | Jan. 6, 1925 |
| 1,564,057 | George | Dec. 1, 1925 |
| 1,834,241 | Gledhill | Dec. 1, 1931 |
| 1,871,542 | McCallum | Aug. 16, 1932 |
| 2,067,700 | Hunt et al. | Jan. 12, 1937 |
| 2,143,363 | Sprague | Jan. 10, 1939 |